United States Patent [19]

Acker

[11] 4,355,284

[45] Oct. 19, 1982

[54] PHASE CORRECTION SYSTEM

[75] Inventor: William F. Acker, Seminole, Fla.

[73] Assignee: Honeywell Inc., Minneapolis, Minn.

[21] Appl. No.: 209,616

[22] Filed: Nov. 24, 1980

Related U.S. Application Data

[60] Continuation of Ser. No. 100,781, Dec. 5, 1979, abandoned, which is a division of Ser. No. 829,705, Sep. 1, 1977, Pat. No. 4,207,523.

[51] Int. Cl.$^3$ .................... H03K 6/00; G01R 25/04; G01R 25/08
[52] U.S. Cl. ..................................... 328/155; 375/95; 307/511
[58] Field of Search .................... 328/155, 55; 375/95, 375/118, 119; 307/511, 262

[56] References Cited

U.S. PATENT DOCUMENTS

| | | | |
|---|---|---|---|
| 3,934,205 | 1/1976 | Bogert | 375/119 X |
| 3,988,696 | 10/1976 | Sharpe | 328/155 X |
| 4,095,186 | 6/1978 | Vesel | 328/55 X |

Primary Examiner—John S. Heyman
Attorney, Agent, or Firm—Theodore F. Neils

[57] ABSTRACT

A phase correction system is disclosed for adjusting a phase relationship of periodic data samples, based on a level crossing detector identifying certain data samples in connection with a preselected value.

9 Claims, 5 Drawing Figures

PHASE CORRECTION SYSTEM

The invention herein described was made in the course of, or under a contract, or subcontract thereunder, with the Department of the Air Force.

This application is a continuation of application Ser. No. 100,781 filed Dec. 5, 1979 and now abandoned, which was a divisional application of application Ser. No. 829,705 filed Sept. 1, 1977, now U.S. Pat. No. 4,207,523, issued June 10, 1980. That patent is incorporated herein by reference.

BACKGROUND OF THE INVENTION

The present invention relates to a phase correction feedback system for adjusting the phase of an analog signal derived from a digital signal. A typical use would be in digitally based communication channel receivers or monitors. In such a monitor, for instance, such phase correction systems are especially useful in circuits for detecting channel degradation.

Communication channels can be entirely analog extending from the information source to the transmitter, and then along the channel link to the receiver, and finally to the user of the transmitted information. Communication channels can also be digitally based, either totally or partially.

A typical situation is to have a digital information source but where the information is sent in analog form over an analog channel link to a receiver which reconverts the information to a digital format. If the receiver circuits of the system are not of an ideal or optimal design, the receiver circuits may contribute to degradation in the incoming baseband analog signal. In these circumstances, the timing, or clocking, signal of the receiver, derived in the receiver from the incoming baseband analog signal, cannot be an accurate indication of the actual timing intended for events occurring in the incoming baseband analog signal. For a monitoring system used to monitor such a channel in which monitoring system these receiver circuits are duplicated, this receiver derived clocking signal, hereinafter termed the BAUD CLOCK signal, cannot then be relied upon for monitor system timing, and, further, there may be phase delays in the monitor system which must be compensated.

For these reasons two further timing, or clocking signals may be derived in such a monitor system, the MONITOR SYSTEM CLOCK and the PHASE CORRECTED BAUD CLOCK signals, which are used for monitor system timing. The PHASE CORRECTED BAUD CLOCK and MONITOR SYSTEM CLOCK signals, although obtained from the BAUD CLOCK signal, are developed in a feedback loop intended to correct some of the degradation which might occur in the BAUD CLOCK signal and to compensate monitor system phase delays.

The receiver circuit phase-lock loop which derives the BAUD CLOCK signal may be subject to temperature variation, a situation which could possibly be eliminated in the actual receiver by maintaining the environment thereabout at a relatively constant temperature level. This is a very gradually occurring source of error for most phase-lock loops which could reasonably be adjusted away in practice, and so should probably be eliminated from the causes of timing variation in the timing signal derived from the incoming signals being monitored and used to time the operation of the monitor system.

On the other hand, the phase-lock loops used in the receiver circuits are quite often affected by noise level in a rather dynamic manner and these probably should be allowed to affect the timing signals used in operating the monitor system. This is because the errors, reflected as phase jitter, etc., can cause signal degradation which cannot be adjusted away at the channel receiver. Thus, there is a need for a slow-acting, timing control feedback loop to correct certain slowly changing timing errors in the timing signal extracted from the incoming baseband analog signal. Yet, this loop should not remove the dynamic timing errors which surely should be considered for the effect they may have on the performance of the digitally based communication channel.

SUMMARY OF THE INVENTION

A phase correction system is provided for adjusting a phase relationship of periodic data samples. A level crossing detector identifies those data samples for which there is an indication that the corresponding portion of the incoming baseband analog level of the signal crosses a preselected value and the direction of that crossing, i.e. whether the signal is rising or falling. The observed values of such data samples are compared with the preselected value. The result of this comparison is combined with the crossing direction information to determine if such data samples were early or late. This information in turn controls the timing of the sampling via a slow-acting feedback loop.

BRIEF DESCRIPTION OF THE DRAWINGS

FIG. 1 is a system diagram of the invention,

DESCRIPTION OF A PREFERRED EMBODIMENT

The preferred embodiment will be described as it would be implemented in a monitor system associated with a three level partial response digitally based communication channel. In such a system, only the center level value is crossed so the phase test comparisons are made at that level, which is assumed to be zero volts.

In FIG. 1, the correction of the BAUD CLOCK signal, derived from channel receiver circuits, is accomplished through a controlled phase shifter, 51, to which the BAUD CLOCK signal is provided. Controlled phase shifter 51 adjusts the phase of the BAUD CLOCK signal insofar as this signal operates a sample and hold circuit, 18, to initiate sampling of the incoming baseband analog signal. Controlled phase shifter 51 exercises its control in response to the PHASE CORRECTION signal provided to it from the monitor system phase correction block, 52. Monitor system phase correction block 52 receives, among its inputs, a signal from a monitor system update enable block, 53, which serves as a zero crossing and direction of crossing detector.

Monitor system update enable block 53 is used because of the manner in which errors in the PHASE CORRECTED BAUD CLOCK signal from phase shifter 51 controlling the sample and hold circuit 18 are detected. These errors are detected through observing those data samples taken from the incoming baseband analog signal near times that this signal is passing through the center expected incoming signal level as indicated above.

The level of the incoming analog baseband signal is classified as to which portion of the amplitude range in which it occurs by amplitude range classifier 100. Sample and hold section 18 retains for a baud period the signal level of the incoming baseband analog signal present at its input when triggered by a PHASE CORRECTED BAUD CLOCK signal pulse. The value thus held is compared with each of a group of reference levels by comparator means. The information obtained by this comparison is transmitted to the output logic section of amplitude range classifier 100. The output of range classifier 100 is a group of logic signals indicating which portion of the amplitude range the signal level of the incoming baseband analog signal in sample and hold section 18 occurs. Lines 101, 102, and 103 carry logic signals $X > -d$, $X > 0$, and $X > +d'$, respectively, where X is the value of the incoming baseband analog signal, 0 is the center level expected signal level, and $-d$ and $d'$ are the lower and upper decision levels, respectively. That is a data sample having an amplitude greater than $+d'$ will be interpreted as having an intended value equal to the upper expected incoming signal level and a data sample having an amplitude equal to or less than $-d$ will be interpreted as having an intended value equal the lower expected incoming signal level. The signal on each of these lines will assume a logical true value if the incoming baseband analog signal has a value above the amplitude value associated with that line. Also shown are lines 103a-d which carry similar logic signals associated with other divisions of the amplitude range for use in other portions of the monitor circuit. More lines may be necessary depending upon the nature of the error detection circuit.

If the incoming baseband analog signal is rising at the sampling time, sampling late will cause the data sample obtained for an incoming signal without offset therein to exceed zero leading to the logic signal $(X>0)$ from amplitude range classifier 100 being in the high state as a true output. On the other hand, if an offset free incoming baseband analog signal were near zero and falling at the sampling time, sampling a zero crossing late would produce a false or low logic state value in the logic signal $(X>0)$. Therefore, to detect the direction of a phase error in the PHASE CORRECTION BAUD CLOCK, one must know (i) whether the data sample in question, as to being of proper phase when taken from the incoming baseband analog signal, was taken at or close to a zero crossing, and (ii) whether the incoming baseband analog signal is rising or falling when the data sample in question was taken.

This information is inferable whenever (i) the data sample preceding the data sample in question was a data sample having an amplitude nominally equal to the upper expected incoming signal level, and the data sample following the data sample in question has an amplitude nominally equal to the lower expected incoming signal level to form a falling signal pattern, or (ii) the data sample preceding the data sample in question was a data sample having an amplitude nominally equal to the lower expected incoming signal level, and the data sample following the data sample in question has an amplitude nominally equal to the upper expected incoming signal level to form a rising signal pattern. In both of these instances, the incoming baseband analog signal is known to have passed through, or nearly through, zero at the sampling time of the data sample in question. And, in the first instance, one knows the incoming baseband analog signal was falling at the time the data sample in question was obtained, while in the second instance, one knows that the incoming baseband analog signal was rising at the time the data sample in question was obtained. This kind of information is extracted from the data samples obtained from sample and hold circuit 18 in both amplitude range classifier 100 and monitor system update enable 53.

As stated above, monitor system update enable 53 serves as a zero crossing detector and a crossing direction detector. The information is needed because, as indicated, there are two data sample patterns which must be detected. These patterns must be detected to indicate whether a particular data sample in question, obtained from the incoming baseband analog signal, was at or near the center expected incoming signal level through the incoming signal yielding data samples found to occur in either of the above rising or falling patterns, i.e. whether the data sample in question is to be taken to be a countable data sample for purposes of operating the monitor system phase correction block 52. Further, the monitor system update enable 53 must indicate which of these patterns the data sample in question, if determined to be a countable data sample, was found to be in, either a rising pattern indicating an increasing incoming baseband analog signal or a falling pattern indicating a decreasing incoming signal.

In more detail, this information is to be determined by noting (i) whether the incoming baseband analog signal was at the lower expected incoming signal level in the baud period previous to that baud period in which the data sample in question appears and whether the incoming signal then proceeds to the upper expected incoming signal level in the baud period following the baud period in which the data sample in question appears, or (ii) whether the incoming baseband analog signal was at the upper expected incoming signal level in the baud period previous to the baud period in which the data sample in question appears and whether the incoming signal then proceeds to the lower expected incoming signal level in the baud period following the baud period in which the data sample in question appears. If so, then the data sample in question, as a countable data sample, will separate a pair of acceptable data samples in such a manner as to provide one or the other of the following patterns: (i) $X_{n-2} = +2d'$, $X_{n-1} = 0$, $X_n = -2d$, or (ii) $X_{n-2} = -2d$, $X_{n-1} = 0$, $X_n = +2d'$. In these equalities, $X_n$ represents the signal level during the current baud period, $X_{n-1}$ represents the signal level value during the baud period immediately preceding the current baud period and $X_{n-2}$ represents the signal level value during the baud period immediately preceding baud period $n-1$. The variables $2d'$, 0, and $-2d$ represent the values of the upper, center, and lower level expected signal values, respectively. The data samples $X_{n-2}$ and $X_n$ form, in each of those instances, a pair of acceptable data samples separated by the countable data sample $X_{n-1}$.

Figure 2:
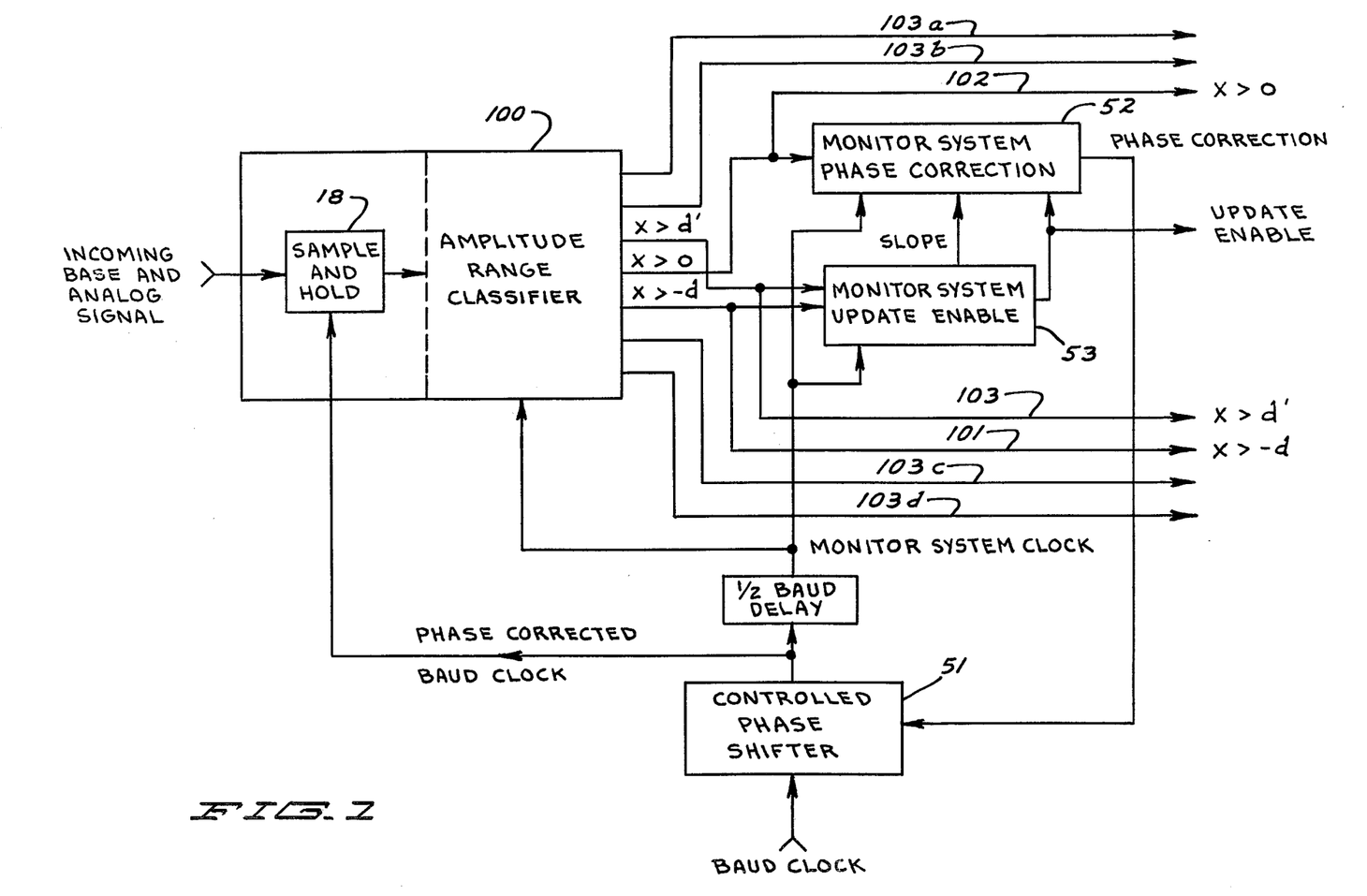
FIG. 2 is a schematic diagram of a level crossing detector and crossing direction detector.

Turning now to FIG. 2, there is provided a logic diagram for a logic system capable of detecting the foregoing sequences of data samples in the stream of data samples obtained from the incoming baseband analog signal, this apparatus comprising the contents of monitor system updata enable 53. The incoming logic signals in FIG. 2 have been written as they are obtained from amplitude range classifier 100 in FIG. 1, and then these logic signals have been rewritten in FIG. 2 with a counting subscript n to indicate which baud period the logic signal represents as described above.

In FIG. 2, when the logic signal $(X_n > d')$ is true, the amplitude value $X_n$ of the data sample in the $n^{th}$ baud period in the incoming baseband analog signal is nominally at the upper expected incoming signal level $+2d'$ volts. The comparator decision as to whether or not this inequality is satisfied in the $n^{th}$ baud period is correspondingly inserted into a flip-flop, 54. This process is repeated for each baud period. Thus, the information is available as to whether or not this inequality was satisfied in the baud period immediately preceding the current one by virtue of the storage of this information in that preceding baud period in flip-flop 54. Further, the information as to whether this inequality was satisfied or not two baud periods previous to the current baud period is transferred to and retained in another flip-flop, 55, connected to the output of flip-flop 54. The outputs of flip-flops 54 and 55 are thus the logic signals $(X_{n-1} > d')$ and $(X_{n-2} > d')$, respectively. Flip-flops 54 and 55 thus serve as a high range storage means.

When the logic signal $(X_{n-1} > -d)$ is false, the current data sample has an amplitude $X_n$ intended to equal the lower expected incoming signal level of $-2d$ volts. Therefore, the logic signal $(X_n > -d)$ is passed through an inverter, 56, to provide the logic signal $(X_n > -d)$. This logic signal is stored for the baud period immediately previous to the current one in a flip-flop, 57, and is transferred and retained for two baud periods previous to the current one in another flip-flip, 58, connected to the output of flip-flop 57. The logic signals available at the outputs of flip-flops 57 and 58 are $(X_{n-1} > -d)$ and $(X_{n-2} > -d)$, respectively. Flip-flops 57 and 58 serve as a low range storage means.

With this information available from flip-flops 54, 55, 57, and 58, the presence of one of the desired data sample patterns, described above, in the stream of data samples obtained from the incoming baseband analog signal can be detected. Two AND gates, 59 and 60, are used to detect the desired patterns of data samples, each of these AND gates being capable of detecting one of the desired patterns. AND gate 59 detects the presence of a countable data sample obtained from the incoming baseband analog signal at a time when this signal is in an increasing pattern. One input to AND gate 59 is supplied with the current baud period logic signal $(X_n > d')$ which indicates whether the current data sample $X_n$ has an amplitude nominally equal to the upper expected incoming signal level of $+2d'$ volts. The other input of AND gate 59 is supplied the logic signal $(X_{n-2} > -d)$ which indicates whether the data sample occurring two baud periods previous to the current baud period has an amplitude value that was nominally equal to the lower expected incoming signal level of $-2d$ volts.

If both of these signals supplied to AND gate 59 are true, there is a rising pattern in the incoming baseband analog signal occurring over the current baud period and the past two baud periods and, necessarily, the data sample occurring one baud period previous to the current baud period $X_{n-1}$ must have an amplitude value intended to equal the center expected incoming signal level. AND gate 60, in a similar manner, detects whether the data sample in the baud period previous to the current baud period, $X_{n-1}$, has an amplitude value intended to equal the center expected incoming signal level and whether this data sample was obtained from the incoming baseband analog signal during a time this signal was in a decreasing pattern occurring over the current baud period and the two previous baud periods. Hence, AND gate 60 also determines certain data samples to be countable data samples.

Since either of these data sample patterns are to be accepted as indications of countable data samples in the manner and for the purposes set out above, the outputs of AND gates 59 and 60 are supplied to an OR gate, 61. OR gate 61 provides an output signal, UPDATE ENABLE, indicating that one or the other of the pertinent data sample patterns has occurred over the current baud period and the two previous baud periods. Thus, the UPDATE ENABLE signal indicates that the data sample in the previous baud period was a countable data sample, a data sample obtained when an increasing or decreasing pattern incoming baseband analog signal portion passed through the center expected incoming signal level of zero volts.

A data sample, obtained from the incoming baseband analog signal in the current baud period, will have have an amplitude occurring nominally at either the upper expected incoming signal lever or at the lower expected incoming signal level at times when the UPDATE ENABLE signal is true indicating this data sample is a member of an acceptable pair of data samples separated by a countable data sample. Such a current data sample will indicate whether the incoming baseband analog signal was in an increasing or decreasing pattern, i.e. its slope direction, positive or negative, when this signal passed through zero volts in the baud period before the current one. Hence, either one of the logic signals $(X_n > d')$ or $(X_n > -d)$ can serve to indicate the slope direction of the incoming baseband analog signal for each associated zero crossing event.

Thus, in FIG. 2, the logic signal $(X_n > -d)$, indicating whether or not the data sample obtained from the incoming baseband analog signal in the current baud period has an amplitude nominally equal to the lower expected incoming signal level, has been taken as an output in FIG. 2. If logic signal $(X_n > -d)$ is true, a falling pattern has been detected if UPDATE ENABLE is also true. For this output, the output signal shown can be taken as either the logic signal $(X_n > -d)$, or redesignated as the logic signal, SLOPE.

Figure 3:
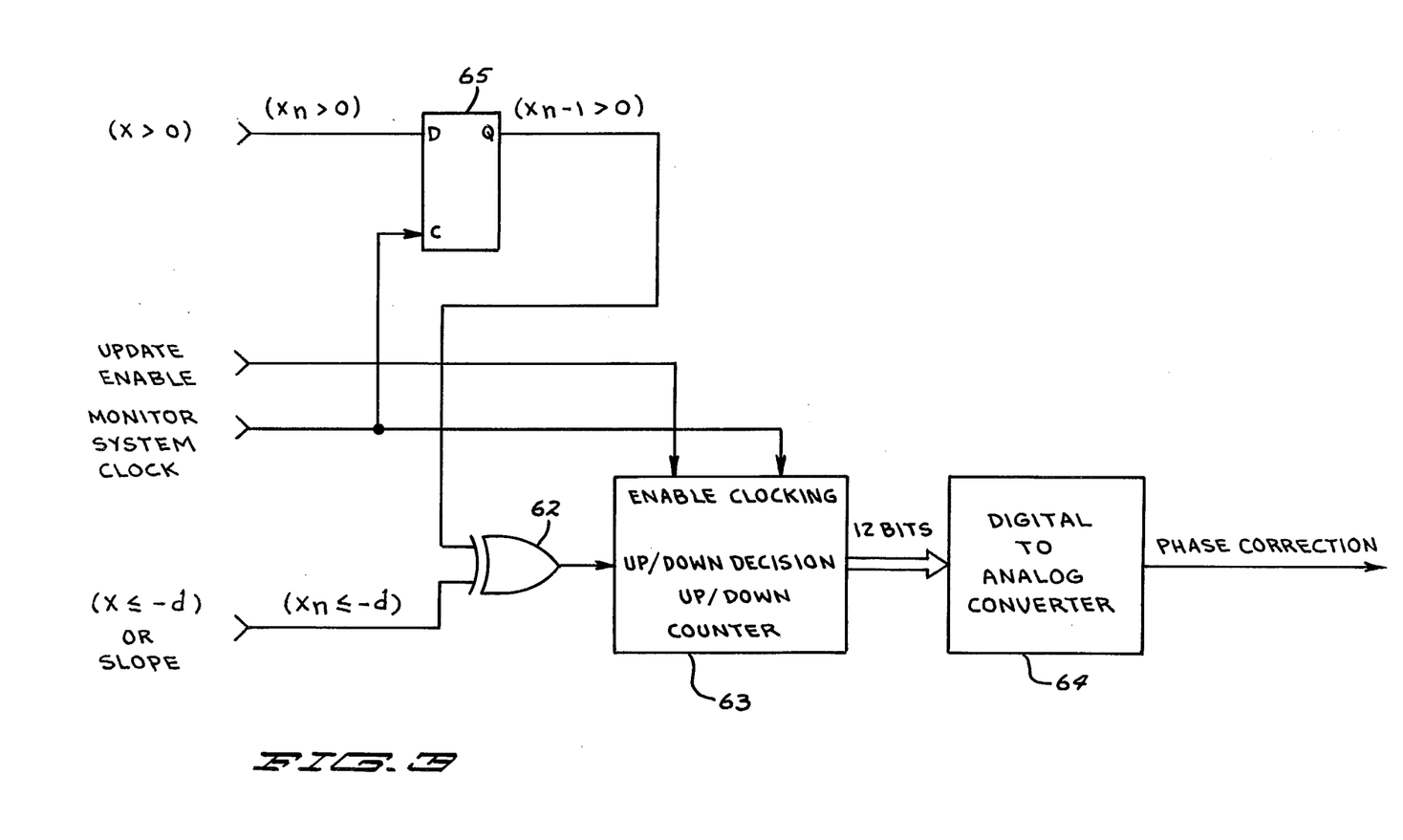
FIG. 3 is a schematic diagram of the phase correction module.

The signals UPDATE ENABLE and SLOPE are provided to the block 52 monitor system phase correction as shown in FIG. 1. FIG. 3 shows the components comprising the block 52 monitor system phase correction The monitor system phase correction comprises an EXCLUSIVE-OR logic gate, 62, an up/down binary counter, 63, a digital-to-analog converter, 64, and D-type flip-flop, 65.

EXCLUSIVE-OR gate 62 determines when the sampling phase is late. If the SLOPE logic signal, i.e. $(X_n > -d)$, is in the true state at the same time the UPDATE ENABLE logic signal is in the true state, the SLOPE logic signal indicates that the incoming baseband analog signal was in a falling pattern (during the current and two previous baud periods) when the data sample obtained from this signal in the baud period previous to the current one was nominally equal to the center expected incoming signal level. Now, in conjunction with the SLOPE logic signal and the UPDATE ENABLE logic signals both being true, the data sample from the baud period preceding the current baud period may be sampled late, i.e. the incoming baseband analog signal was directed to be sampled by the PHASE CORRECTED BAUD CLOCK signal after the time at which it went through the center expected incoming signal level of zero. Then the amplitude of this data sample will actually be negative rather than zero (for an offset free incoming signal) causing the logic signal ($X_{n-1} > 0$) to be false.

The logic signal ($X > 0$) is obtained from the amplitude range classifier 100 as shown in FIG. 1 and for FIG. 3, this logic signal is rewritten as ($X_n > 0$) to indicate that it is provided in FIG. 3 in the current baud period. Since this logic signal is supplied to D-type flip-flop 65 for storage for one baud period, the output of flip-flop 65 provides the logic signal ($X_{n-1} > 0$) which, of course, represents information concerning the data sample occurring in the baud period immediately previous to the current one.

When the SLOPE logic signal is true and when the ($X_{n-1} > 0$) signal is false, there will be an output from EXCLUSIVE-OR gate 62 which indicates that the sampling phase is late. Similarly, if the data sample from the baud period previous to the current one is indicated by a true UPDATE ENABLE Logic signal to have occurred when the incoming baseband analog signal was nominally equal the center expected incoming signal level, and this signal was in a rising signal pattern, the SLOPE logic signal will be false. Then, the actual amplitude of this data sample will be positive with respect to the center expected incoming signal level of zero if the sampling directed by the PHASE CORRECTED BAUD CLOCK signal is late because the incoming baseband logic signal (assumed offset free) will have passed through zero before the sampling has occurred. That is, if the sampling phase is late, the logic signal ($X_{n-1} > 0$) will be true. The two logic signals, SLOPE and ($X_{n-1} > 0$), occurring in the opposite logic state will cause the EXCLUSIVE-OR gate 62 to again provide a true output indicating that the sampling phase is late. Thus, sampling late will produce a true state in the EXCLUSIVE-OR gate 62 output as the indication that the sampling phase is late for either an increasing or a decreasing pattern incoming baseband analog signal portion passing through zero.

On the other hand, it may be shown that the sampling of increasing or decreasing incoming baseband analog signal portions early, at times when this incoming signal is nominally equal to the center expected incoming signal level, will cause EXCLUSIVE-OR gate 62 to have a false state output at, of course, times when the UPDATE ENABLE Logic signal is true. Thus, the situation of early samplings of increasing or decreasing pattern incoming baseband analog signal portions, at times when the signal amplitude nominally equals the center expected incoming signal level, will lead to false states at the output of EXCLUSIVE-OR gate 62 when the UPDATE ENABLE signal is true. This situation indicates there has been a countable data sample in the baud period immediately previous to the current one.

The output signal from EXCLUSIVE-OR gate 62 is provided to the up/down decision input of counter 63 to control the counting direction therein, and the UPDATE ENABLE logic signal is provided to counter 63 to enable its counting. Then, the MONITOR SYSTEM CLOCK signal acts to cause the count total kept in counter 63 to be altered in each baud period, but can do so only when counter 63 is enabled by the UPDATE ENABLE signal being at the true logic value. When the output of EXCLUSIVE-OR gate 62 is in the true state, counter 63 will increase the count total therein by one count, i.e. increase its count total by one count in response to the circumstance occurring that the sampling phase is late. When the sampling phase is early, counter 63 will decrease the count total therein by one count in response to the false state appearing at the output of EXCLUSIVE-OR gate 62. A preponderance of counts, in either the up direction or the down direction, leads to a count total in counter 63 indicating that the sampling is not being correctly directed in time by the PHASE CORRECTED BAUD CLOCK signal with respect to the incoming baseband analog signal, at least for the point of the incoming signal intended to equal the center expected incoming signal level.

Only the twelve most significant bits of the count total in counter 63 are provided to converter 64. To increase the time constant of the phase correction feedback loop, counter 63 is typically capable of keeping a count total of somewhere around $2^{20}$ counts. Thus, the time constant for the phase correction loop can be adjusted by the total number of counts permitted to accumulate in counter 63 to thereby satisfy the requirement that the feedback loop only compensates for relatively slow-acting causes of phase shift errors.

Figure 4A:
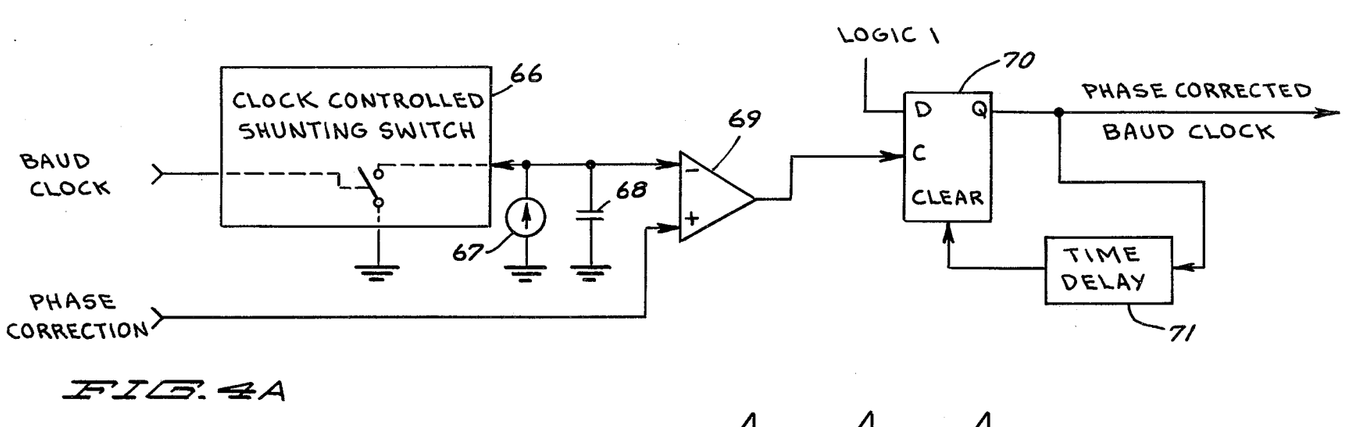
FIGS. 4A and 4B are drawings of a voltage controlled phase shifter in connection with the present invention.

The signal provided by converter 64, the signal PHASE CORRECTION, is provided to control the amount of phase shift introduced by phase shifter 51 into the BAUD CLOCK timing signal derived from the channel receiver circuits to form the PHASE CORRECTED BAUD CLOCK signal. The signal PHASE CORRECTION, the analog voltage signal provided by converter 64 which controls phase shifter 51, is also shown provided in FIG. 4A. FIG. 4A is a system diagram for the controlled phase shifter block 51 in FIG. 2.

In FIG. 4A, a clock controlled shunting switch, 66, is connected across a current source, 67, and a capacitor, 68. Current source 67 acts to charge capacitor 68 whenever switch 66 is open; however, when switch 66 closes, capacitor 68 is discharged and the current from current source 67 is shunted to ground.

Figure 4B:
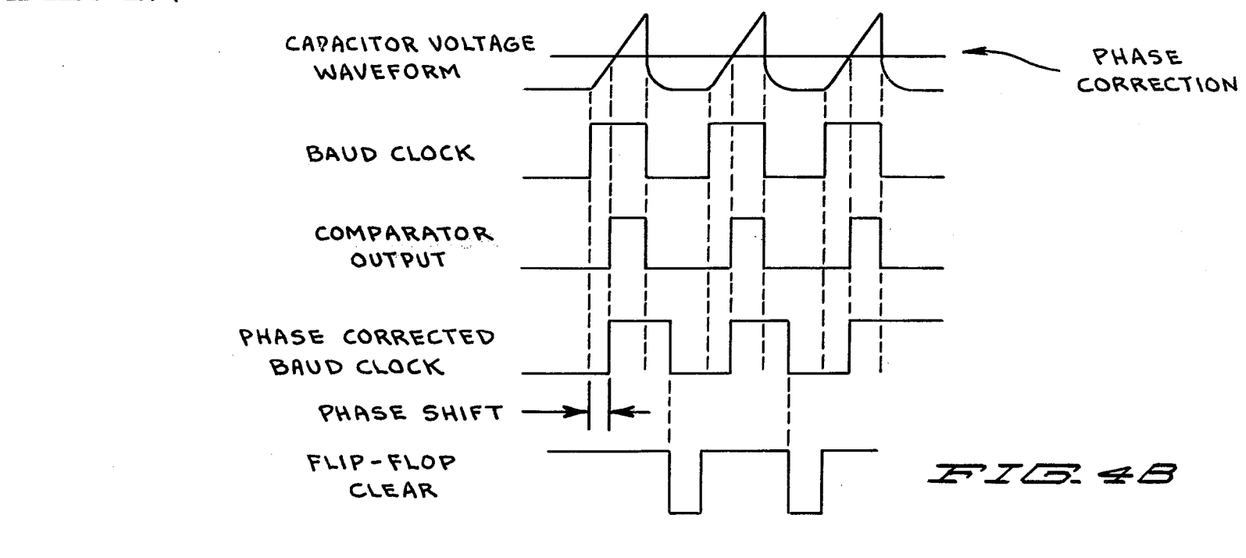

Switch 66 is controlled by the BAUD CLOCK timing signal, a sample over time being shown in FIG. 4B. The leading edge of the BAUD CLOCK signal opens the shunting switch to permit current source 67 to charge capcitor 68 leading to a voltage waveform across this capacitor which is approximately a linear function of time. The trailing edge of the BAUD CLOCK signal closes switch 66 to discharge capacitor 68. A portion of the resulting voltage waveform across capacitor 68 as a function of time is shown in FIG. 4B. Voltage plotted on the coordinate axes in FIG. 4B becomes more positive in the upward direction. This capacitor voltage waveform is the voltage applied to the inverting input of an analog comparator, 69.

The non-inverting input of comparator 69 receives the PHASE CORRECTION signal from the monitor system phase correction block 52. The slowly changing PHASE CORRECTION signal appears to be a nearly unvarying, direct voltage insofar as the controlled phase shifter system 51 is concerned and is, therefore, shown as a horizontal line across the capacitor voltage waveform in FIG. 4B, at an arbitrary level by way of example. When the capacitor voltage waveform rises to the level of this horizontal line, it is just sufficient to cause a signal level shift at the output of comparator 69. The corresponding output voltage signal of comparator 69 over time is shown in FIG. 4B where there is a dashed lined from the leading edge of each comparator output pulse to the corresponding switching point on the capacitor voltage waveform of FIG. 4B. This switch point occurs where the PHASE CORRECTION signal equals, i.e. crosses, the capacitor voltage waveform at its rising or leading edge in each period of the CLOCK signal.

The output signal of comparator 69 is applied to the clock input of a D-type flip-flop, 70. A true logic state signal is continuously applied to the D input of flip-flop 70 so that flip-flop 70 will set its output to the true state every time comparator 69 has an output signal level shift upward. The result at the output of flip-flop 70 is the signal PHASE CORRECTED BAUD CLOCK. A portion of this signal over time is shown in FIG. 4B and the resulting phase shift between the BAUD CLOCK signal and the PHASE CORRECTED BAUD CLOCK signal is indicated there. Clearly, if the signal PHASE CORRECTION increases and so moves upward on the capacitor voltage waveform shown in FIG. 4B, the phase shift of the leading edge of the signal PHASE CORRECTED BAUD CLOCK will increase with respect to the leading edge of the signal BAUD CLOCK.

The duty cycle of the PHASE CORRECTED BAUD CLOCK signal is controlled by a time delay circuit, 71, shown in FIG. 4A. The output voltage pulse from time delay circuit 71 clears flip-flop 70 to the low level logic state in preparation for the next cycle in the BAUD CLOCK signal. The duty cycle of the signal PHASE CORRECTED BAUD CLOCK thus depends on the length of the time delay provided in time delay circuit 71. This time delay can be set by using a selected fixed delay, or it can be set by use of an automatic control loop sensing the duty cycle of the signal PHASE CORRECTED BAUD CLOCK which can provide some command against which the time delay can be adjusted to determine the duty cycle in the PHASE CORRECTED BAUD CLOCK signal. An automatically controlled delay can have the advantage of continually correcting for variable delays occurring in the circuit in which the sensing occurs due to temperature, aging, etc.

A fully developed circuit for use as a voltage controlled phase shifter is shown in U.S. Pat. No. 4,207,523, previously cited.

I claim:

1. A phase correction system for adjusting a phase relationship of periodic data samples, each occurring in a data sample period, which constitute a data signal formed as a sequence of said data samples, said phase correction system adjusting in such a manner that certain of said data samples those intended to have a value substantially equal to a reference signal level at a certain point in a corresponding said data sample period-are adjusted toward occurring at said point in said corresponding data sample period, said phase correction system comprising:

an intended reference level crossing and crossing direction detector means, adapted to receive said data signal, and which has both a crossing detector output and a crossing direction detector output, said intended reference level crossing and crossing direction detector means being capable of determining as a countable data sample, those of said data samples which correspond to and which separate members of acceptable pairs of other said data samples, a said pair of said data samples being acceptable if (i) one said member thereof has a value that substantially exceeds that value of said separating data sample corresponding thereto, and if (ii) said member thereof remaining has a value that is substantially less than that value of said separating data sample corresponding thereto, said intended reference level crossing and crossing direction detector means being capable of providing (i) as a crossing detector output signal, an indication, at said crossing detector output, as to which of said data samples are said countable data samples, and being capable of providing (ii) as a crossing direction detector output signal, an indication, at said crossing direction detector output, as to which of said countable data samples, on a selected side thereof, has a said member of said acceptable data sample pair corresponding thereto either exceeding or, selectively, being less than that value held by said corresponding countable data sample;

a comparator means, adapted to receive said data signal, and which has a comparison output, said comparator means being capable of providing as a comparator output signal an indication, at said comparator output, as to which of said countable data samples have values which occur on a selected side of said reference signal level;

a counter means, connected to each of said crossing detector output, said crossing direction detector output, and to said comparator output, and which has a counter means output, said counter means being capable of keeping a count total therein and being capable of being enabled to alter said count total by said crossing detector output signal and said counter means being capable of being directed whether to increase or decrease said count total by both said crossing direction detector output signal and said comparator output signal, said counter means being capable of providing at said counter means output, as a counter output signal, a signal having a value which indicates whatever value said count total has reached in said counter means; and a periodic timing means which has a periodic timing signal of a timing period having a substantially fixed relation to said data sample period, and which is connected to said counter means output, said periodic timing means being capable of varying in phase said data signal with respect to said timing period in response to said counter output signal.

2. The apparatus of claim 1 wherein said counter means includes an EXCLUSIVE-OR logic gate having an EXCLUSIVE-OR logic gate output and first and second EXCLUSIVE-OR logic gate inputs, said first EXCLUSIVE-OR logic gate input being connected to said comparator output and said second EXCLUSIVE-OR logic gate input being connected to said crossing direction detector output, said counter means further including an up/down counter having an up/down counter enable input and an up/down counter decision input, said up/down counter enable input being connected to said crossing detector output and said up/down counter decision input being connected to said EXCLUSIVE-OR output.

3. The apparatus of claim 2 wherein said count total is maintained in an up/down counter and said up/down counter has an up/down counter output, said up/down counter being capable of providing a parallel m bit signal indicative of said count total maintained in said up/down counter to said up/down counter output, and said counter means further includes a digital-to-analog converter means having a digital-to-analog converter means input and a digital-to-analog converter means output, said digital-to-analog converter means being capable of accepting a parallel n bit signal at said digital-to-analog converter means input, said digital-to-analog converter means input being connected to said up/down counter output and said digital-to-analog converter means output serving as said counter means output.

4. The apparatus of claim 3 wherein m is greater than n.

5. The apparatus of claim 2 wherein said comparator means includes a comparator storage means having a comparator storage means output, said comparator storage means output serving as said comparator output.

6. The apparatus of claim 2 wherein said intended reference level crossing detector means comprises:

an incoming signal amplitude range classifier for determining whether said data samples are within certain amplitude ranges and having first and second classifier outputs, said incoming signal amplitude range classifier being capable of providing (i) as a first classifier output signal an indication for each said data sample, at said first classifier output whether that said data sample has a value that is within a first selected range, and providing (ii) as a second classifier output signal an indication for each said data sample at said second classifier output, whether that said data sample has a value that is within a second selected range;

a high range storage means having a high range storage means input and a high range storage means output, said high range storage means capable of providing as a high range storage means output signal an indication, at said high range storage means output, whether a said data sample, preceding that said data sample corresponding to a current value of said first classifier output signal, had a value that was within said first selected range, said high range storage means input being connected to said first classifier output;

a low range storage means having a low range storage means input and a low range storage means output, said low range storage means being capable of providing as a low range storage means output signal an indication at said low range storage means output, whether a said data sample, preceding that said data sample corresponding to a current value of said second classifier output signal, had a value that was within said second selected range, said low range storage means input being connected to said second classifier output;

a rising pattern AND logic gate having first and second rising pattern AND logic gate inputs and a rising pattern AND logic gate output, said first rising pattern AND logic gate input being connected to said first classifier output and said second rising pattern AND logic gate input being connected to said low range storage means output;

a falling pattern AND logic gate having first and second falling pattern AND logic gate inputs and a falling pattern AND logic gate output, said first falling pattern AND logic gate input being connected to said second classifier output and said second falling pattern AND logic gate input being connected to said high range storage means output; and a combining OR logic gate having first and second combining OR logic gate inputs and a combining OR logic gate output, said first combining OR logic gate input being connected to said rising pattern AND logic gate output and said second combining OR logic gate input being connected to said falling pattern AND logic gate output, and said combining OR logic gate output serving as said crossing detector output.

7. The apparatus of claim 6 wherein said count total is maintained in an up/down counter and said up/down counter has an up/down counter output, said up/down counter being capable of providing a parallel m bit signal indicative of said count total maintained in said up/down counter to said up/down counter output, and said counter means further includes a digital-to-analog converter means having a digital-to-analog converter means input and a digital-to-analog converter means output, said digital-to-analog converter means being capable of accepting a parallel n bit signal at said digital-to-analog converter means input, said digital-to-analog converter means input being connected to said up/down counter output and said digital-to-analog converter means output serving as said counter means output.

8. The apparatus of claim 7 wherein said comparator means includes a comparator storage means having a comparator storage means output, said comparator storage means output serving as said comparator output.

9. The apparatus of claim 8 wherein m is greater than n.

* * * * *